J. T. MAGUIRE.
DIAL AND POINTER FOR PRICE COMPUTING SCALES.
APPLICATION FILED JULY 1, 1912.
1,042,360.
Patented Oct. 22, 1912.
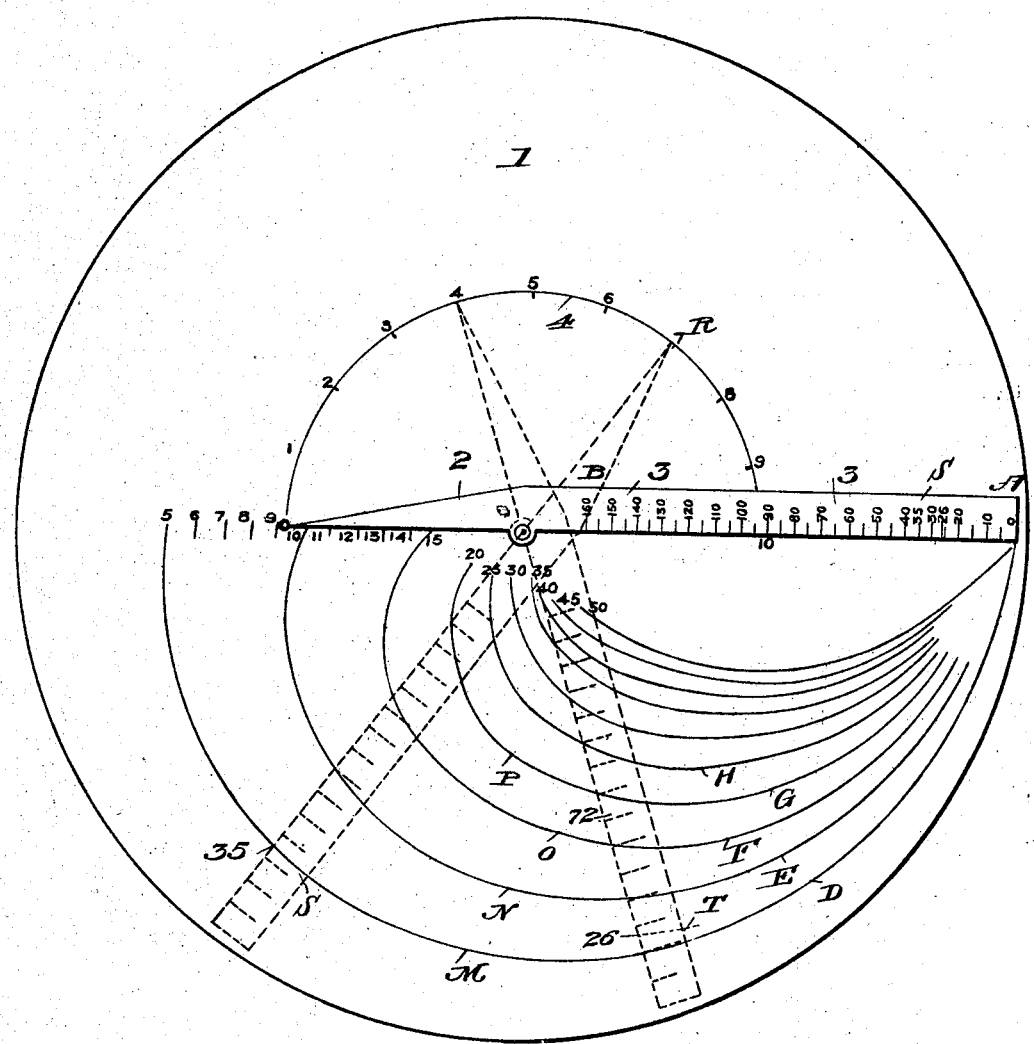
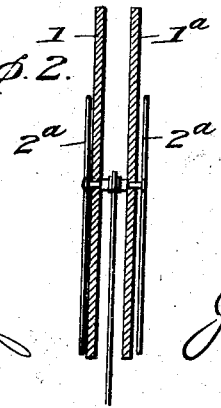

UNITED STATES PATENT OFFICE.

JOSEPH T. MAGUIRE, OF WASHINGTON, DISTRICT OF COLUMBIA.

DIAL AND POINTER FOR PRICE-COMPUTING SCALES.

1,042,360.

Specification of Letters Patent. Patented Oct. 22, 1912.

Application filed July 1, 1912. Serial No. 707,024.

*To all whom it may concern:*

Be it known that I, JOSEPH T. MAGUIRE, a citizen of the United States, residing at Washington, in the District of Columbia, have invented certain new and useful Improvements in Dials and Pointers for Price-Computing Scales, of which the following is a specification.

The object of my invention is the provision of a new dial and pointer for price computing scales which will be simple, may be inexpensively manufactured, will employ a relatively few number of numerals, provide maximum spacing between both unit and total prices while occupying only a minimum dial space and will insure ease of reading both by the customer and merchant and, further, precision of computation whether the unit prices be whole or mixed numbers.

My invention consists, first, in the provision of a dial and pointer, either of which may be movable, the pointer having total prices indicating the amount of the purchase, and the dial being provided with graduations in pounds and with unit prices for reading in conjunction with the total prices on the pointer, according to the weight of the article purchased; second, in a dial and pointer, either of which may be movable, the pointer having total prices to indicate the total cost of the purchase and the dial being provided with graduations representing weight and with unit prices which, as contradistinguished from computing dials heretofore known, are indicated by the plotting of spiral curves, each curve representing the locus of the points of coincidence with the graduations of that particular unit price on the pointer, according to the weight. The provision of the total prices on the pointer, instead of on the dial as heretofore provided in computing scale dials, minimizes the figures and graduations which have to be observed by the merchant and customer, thus rendering the reading of the scale a matter of ease and precision. The plotting of the unit prices on the dial by spiral curves affords a maximum of spacing at all points, minimizes the figures or numerals which have to be employed on the dial to represent unit prices, permits the interpolation of fractional or mixed numbers without actual placing thereof on the dial and also the use of a dial of relatively small size. Preferably, although I do not limit myself thereto, the dial markings may be duplicated on opposite faces thereof and two pointers employed, one for each dial, so that the scales may be read from both sides, enabling the customer and the merchant to simultaneously read the scales.

The invention is adapted for use in connection with any type of scales, whether of the pan, platform, beam, spring, weight, or any other type, as it resides in the dial and pointer construction and plotting alone, and I do not limit myself to either a movable pointer or a movable dial, as the invention may be carried out by employing either of these parts as the movable element.

In the accompanying drawings:—Figure 1 is a front elevation, the pointer being shown at rest in full lines, and in dotted lines as indicating the operation; and Fig. 2, a vertical section showing how the dial and pointer may be made in duplex form.

I have shown the dial as stationary and the pointer as movable.

The dial is shown at 1 and the pointer at 2, the latter being on a shaft and actuated by the weighing part of the scales in any ordinary or preferred manner. The pointer is provided with graduations 3 running from zero at A to the highest total price at B that the scales are designed to indicate. The numbers 3 represent money totals and indicate the total price to be paid for the purchase, according to the weight and price per unit of weight, which latter is indicated on the dial as will presently appear. In this respect my invention is distinguished from all others of which I am aware, for while it has been proposed heretofore to provide on the pointer the unit prices per pound, so far as I am aware, the total prices have heretofore been indicated on the dial. In this respect, the present invention has an advantage in that the eyes of the customer and the merchant need only be directed to the pointer and the indication of the total price is thus rendered easy and precise in its determination.

On the dial 1 there is a graduated scale 4 arranged in the arc of a circle whose center is the pivotal point of the pointer 2, such scale representing pounds and fractions thereof. Beginning at zero, as shown at C, the dial is provided with spiral curves D, E, F, G, H, etc., each curve representing the locus of the points of intersection of the different units of price with the total price graduations 3 on the pointer according to the weight of the article on the scales and its price per pound. The spiral curves are provided at one or more points of their extent with numerals such as M, N, O, P, etc., representing the unit of price. For instance, the lowermost spiral curve represents articles sold at the rate of 5 cents per pound, the next spiral curve represents those sold at 10 cents per pound, etc. The intermediate space may be subdivided, and is preferably so subdivided with spiral curves representing price units of 6, 7, 8 and 9 cents per pound and between the 10 cent and 15 cent curves there may be additional spiral curves representing 11, 12, 13, and 14 cents respectively. If preferred, the spaces between the different curves could be subdivided into fractions, but this would provide too many lines on the dial and is unnecessary as the eye will readily interpolate, without actual plotting, fractional parts of cents and an accurate reading on the pointer 2 is readily obtainable. Preferably, the 5, 10, 15, 20, etc., curves will be printed in some distinctive manner as by color or heaviness and the intermediate curves will be printed lighter or by a differentiating color to enable the eye to more readily read the pointer and dial. It is not essential that the curves D, E, F, G, H, etc., should extend on both sides of the vertical diameter of the dial, nor that the scale 4 should be placed as indicated. Furthermore, the pointer when in a state of rest may be vertical instead of horizontal. Other modifications may be resorted to within the spirit and scope of the invention.

As shown in Fig. 2, the dial may be duplicated on its opposite side 1ª and another pointer 2ª employed, the two pointers being rigidly secured together.

Assuming that the pointer is in the full line position shown in Fig. 1, with its index directed to zero on the scale 4 and a customer desires 7 pounds of sugar at 5 cents per pound, the pointer 2 having turned to the graduation R on the scale 4 representing 7 pounds, the graduation S on the pointer 2 which shows a total price of 35 cents will be found to intercept the 5 cent curve, thus indicating that the total purchase is 35 cents. If the purchaser wishes 4 pounds of a commodity at 6½ cents per pound, it will be found that the 6½ cent curve which is shown interpolated by the eye along the dotted line T will coincide with the graduation 26 on the pointer 2, indicating the total amount of the purchase as 26 cents. Assuming that 4½ pounds of an article whose unit price is 16 cents per pound is desired, it will be found that the total price of 72 cents on the pointer 2 coincides with the 16 cent curve, indicating that the total purchase amounts to 72 cents.

Having thus described my invention, what I claim as new and desire to secure by Letters Patent, is—:

1. In a price computing scale, the combination of a relatively movable pointer and dial, the pointer being provided with graduations having indicia showing total or computed prices, and the dial having points represented by unit prices adapted to register with the graduations of the pointer, said dial having a scale representing different weights, the pointer being arranged to coöperate with said weight-scale, whereby the weight and price per unit of weight being known, the total computed price may be read from the indicia on the pointer.

2. In a price computing scale, the combination of a relatively movable pointer and dial, the pointer being provided with graduations having indicia showing total or computed prices, and the dial having curves which plot the loci of numerous points representing unit prices and arranged to register with the total prices on the pointer, the said dial also having a scale of weights on which the pointer is adapted to indicate, whereby the unit price and weight being known, the total or computed price is indicated by the indicia on the pointer coinciding with the curve representing the unit price.

In testimony whereof, I hereunto affix my signature in presence of two witnesses.

JOSEPH T. MAGUIRE.

Witnesses:
FRANK T. MILLER,
NORRIS F. CLARK.